(12) United States Patent
Lee

(10) Patent No.: US 10,382,667 B2
(45) Date of Patent: Aug. 13, 2019

(54) VISUAL TRACKING SYSTEM HAVING MARK IMAGES WITH MULTIPLE IMAGE DISTANCES

(71) Applicant: TAN CIAN TECHNOLOGY CO., LTD., Taichung (TW)

(72) Inventor: Po Che Lee, Taichung (TW)

(73) Assignee: Tan Cian Technology Co., Ltd., Taichung (TW)

(*) Notice: Subject to any disclaimer, the term of this patent is extended or adjusted under 35 U.S.C. 154(b) by 52 days.

(21) Appl. No.: 15/905,417

(22) Filed: Feb. 26, 2018

(65) Prior Publication Data
US 2018/0255228 A1    Sep. 6, 2018

Related U.S. Application Data

(60) Provisional application No. 62/465,555, filed on Mar. 1, 2017.

(51) Int. Cl.
| | |
|---|---|
| *H04N 5/232* | (2006.01) |
| *H04N 5/225* | (2006.01) |
| *G06T 7/20* | (2017.01) |
| *H04N 5/272* | (2006.01) |
| *G02B 7/09* | (2006.01) |
| *G02B 7/10* | (2006.01) |
| *G06T 7/70* | (2017.01) |
| *G02B 27/01* | (2006.01) |

(52) U.S. Cl.
CPC ........... *H04N 5/23212* (2013.01); *G02B 7/09* (2013.01); *G02B 7/102* (2013.01); *G02B 27/0101* (2013.01); *G06T 7/20* (2013.01); *G06T 7/70* (2017.01); *H04N 5/2254* (2013.01); *H04N 5/272* (2013.01)

(58) Field of Classification Search
CPC .. H04N 5/23212; H04N 5/2254; H04N 5/272; G01S 3/00; G02B 27/0101; G02B 7/102; G02B 7/09; G06T 7/70; G06T 7/20
See application file for complete search history.

(56) References Cited

U.S. PATENT DOCUMENTS

| | | | |
|---|---|---|---|
| 8,970,453 B2* | 3/2015 | Sasaki | G01C 21/365 340/461 |
| 10,068,377 B2* | 9/2018 | Sisbot | B60K 35/00 |
| 2011/0001639 A1* | 1/2011 | Sasaki | G02B 27/0101 340/995.19 |
| 2012/0170130 A1* | 7/2012 | Sasaki | B60K 35/00 359/630 |
| 2014/0362195 A1* | 12/2014 | Ng-Thow-Hing | G06K 9/00791 348/51 |
| 2015/0234185 A1* | 8/2015 | Inomata | G02B 5/02 359/599 |

(Continued)

*Primary Examiner* — Jason A Flohre
(74) *Attorney, Agent, or Firm* — Wang Law Firm, Inc.

(57) ABSTRACT

A visual tracking system includes an image capturing device capturing image frames, a processor receiving the frames to determine tracking objects in the image frames and distances of the tracking objects, and then classify the mark into several object group according to their distances, a mark generating device generating marks relating to the tracking objects respectively, a focusing device having plural of lens members to refract the marks respectively according to the tracking objects they mark. As a result, the mark images on a target will have different image distances to meet the tracking objects.

13 Claims, 14 Drawing Sheets

(56) References Cited

U.S. PATENT DOCUMENTS

2017/0169612 A1* 6/2017 Cashen .................. G06F 3/013
2018/0115687 A1* 4/2018 Yuen .................... H04N 5/2257

* cited by examiner

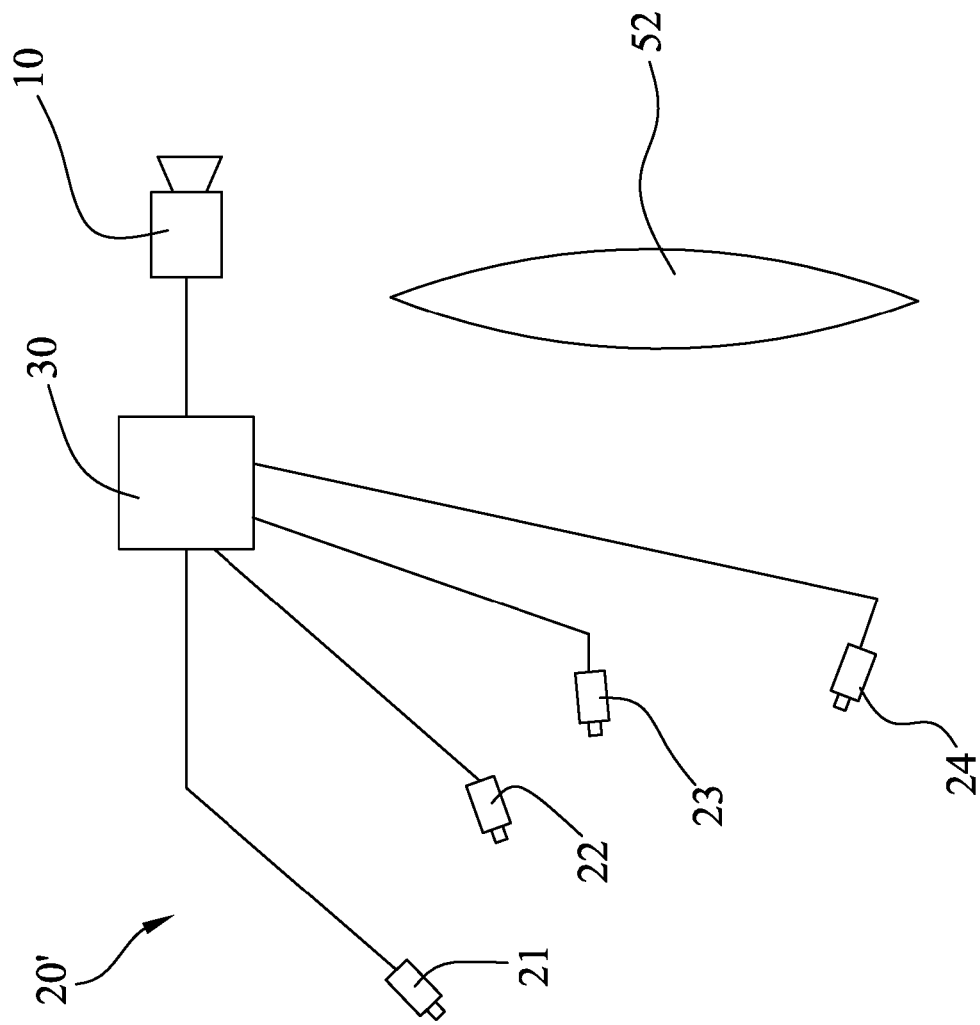
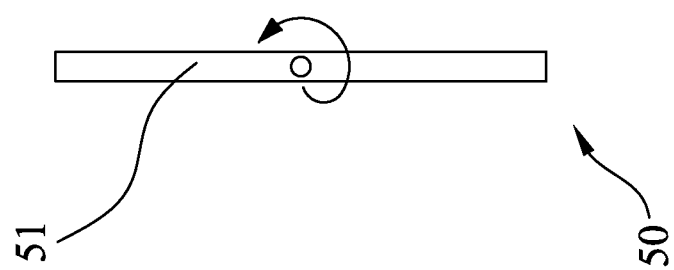
FIG.10

VISUAL TRACKING SYSTEM HAVING MARK IMAGES WITH MULTIPLE IMAGE DISTANCES

BACKGROUND OF THE INVENTION

1. Technical Field

The present invention relates to system which marks and tracks predetermined objects in the vision field, and more particularly, the marks of the tracked objects have difference image distances to meet the tracked objects.

2. Description of Related Art

Monitoring systems are widely used in the present days, such as traffic monitoring system, security monitoring system, etc. The earlier monitoring systems only provide video on a monitor, and the monitoring staff has to watch the video to find anything unusual or the one needed to be located.

The modern monitoring system can automatically mark the objects in the video and track them, however, only one object cane be marked and tracked once. An improved monitoring system can mark and track multiple objects. However, some of the marked objects are near, and some of them are far, but the marks labeled the objects only have the same image distance. It looks weir on the monitor.

BRIEF SUMMARY OF THE INVENTION

In view of the above, the primary objective of the present invention is to provide a visual tracking system, which has mark images with multiple image distances to meeting the objects being tracked.

In order to achieve the objective of the present invention, a visual tracking system includes an image capturing device capturing image frames; a processor receiving the frames from the image capturing device to determine tracking objects in the image frames and distances of the tracking objects, and then classify the tracking objects into a first object group and a second object group according to the distances of the tracking objects; a mark generating device electrically connected to processor to generate marks of a first mark group relating to the tracking objects of the first object group and marks of a second mark group relating to the tracking objects of the second object group, wherein the marks of the first mark group are generated at the same time, the marks of the second mark group are generated at the same time, and the marks of the first mark group and the second mark group are generated in sequence and repeatedly; a focusing device having a first lens member and a second lens member, and the first lens member and the second lens member having different focal lengths; wherein the first lens member and the second lens member are moved to a predetermined position in sequence and repeatedly, whereby when the mark generating device is generating the marks of the first mark group, the first lens member is moved to the predetermined position to refract the marks of the first mark group, and when the mark generating device is generating the marks of the second mark group, the second lens member is moved to the predetermined position to refract the marks of the second mark group; and an imaging device imaging the marks after being refracted by the first lens member or the second lens member onto a target.

The present invention further provides a method of providing mark images with multiple image distances in a visual tracking system, including the following steps:

A. obtaining an image frame;
B. determining tracking objects in the image frame;
C. obtaining distances of the tracking objects, and classifying the tracking objects into a first object group and a second object group according to the distances thereof;
D. generating marks of a first mark group relating to the tracking objects of the first object group and marks of a second mark group relating to the tracking objects of the second object group in sequence and repeatedly;
E. refracting the marks of the first mark group by a first lens member and imaging the marks of the first mark group onto a target, and refracting the marks of the second mark group by a second lens member and imaging the marks of the second mark group onto the target, wherein the first lens member and the second lens member having different focal lengths; and
F. obtaining a new image frame and repeating the step B to the step F.

The present invention further provides a visual tracking system, including an image capturing device capturing image frames; a processor receiving the frames from the image capturing device to determine tracking objects in the image frames and distances of the tracking objects, and then classify the tracking objects into a first object group and a second object group according to the distances of the tracking objects; a mark generating device having a first mark generator and a second mark generator, wherein the first mark generator and the second mark generator electrically connected to processor; the first mark generator generates marks of a first mark group relating to the tracking objects of the first object group, and the second mark generator generates marks of a second mark group relating to the tracking objects of the second object group; and an imaging device having a movable optical member, wherein a distance between the first nark generator and a center of the movable optical member is different from a distance between the second nark generator and the center of the movable optical member; wherein when the first mark generator is generating the marks of the first mark group, the movable optical member is moved to a predetermined position to image the marks of the first mark group onto a target, and when the second mark generator is generating the marks of the second mark group, the movable optical member is moved to another predetermined position to image the marks of the second mark group onto the target.

BRIEF DESCRIPTION OF THE SEVERAL VIEWS OF THE DRAWINGS

The present invention will be best understood by referring to the following detailed description of some illustrative embodiments in conjunction with the accompanying drawings, in which

FIG. 10 is a ketch diagram of a fourth preferred embodiment of the present invention;

DETAILED DESCRIPTION OF THE INVENTION

Figure 1:
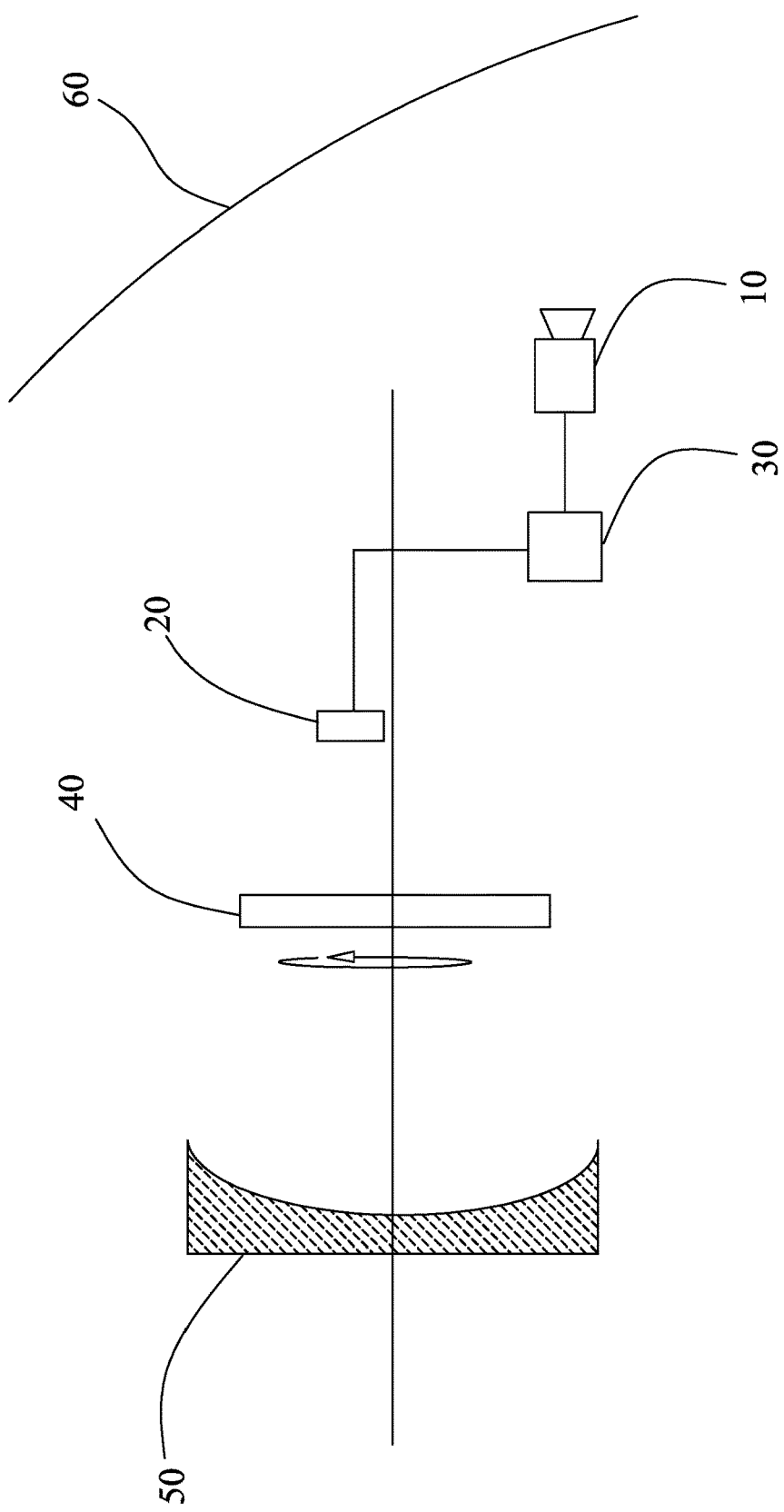
FIG. 1 is a sketch diagram view of a first preferred embodiment of the present invention.

FIG. 1 shows a visual tracking system of the first preferred embodiment, including an image capturing device 10, a mark generating device 20, a processor 30, a focusing device 40, and an imaging device 50, wherein the image capturing device 10, the mark generating device 20, the focusing device 40, and the imaging device 50 are electrically connected to the processor 30, respectively.

The image capturing device 10 is a digital camera to capture image frames and transmit the images to the processor 30. The processor 30 executes an image analyze process to determine which objects in the image frame should be tracked. In the present invention, the objected which are determined to be tracked are defined as tracking objects. The tracking objects can be determined by the image analyze process or determined by manipulation. A calibration process can be executed to make sure that the image frames are constant with a visual field of the user.

Except determining the tracking objects in the image frames, the processor 30 obtains distances of the tracking objects as well, and classify the tracking objects into a first object group, a second object group, a third object group, and a fourth object group. The tracking objects with similar distances are classified into the same object group. For example, the tracking objects between 0 and 5 m are classified into the first object group, the tracking objects between 5 m and 10 m are classified into the second object group, the tracking objects between 10 and 15 m are classified into the third object group, and the tracking objects farther than 15 m are classified into the fourth object group. In the present embodiment, the tracking objects and the distances of the tracking objects are determined by the image analyze process.

The mark generating device 20 is controlled by the processor 30 to generate marks in association with the tracking objects. In the present embodiment, the mark generating device 20 could be a liquid crystal display (LCD), a digital light processing (DLP), a liquid crystal on silicon (LCOS), or an organic light emitting device (OLED), or other equivalent devices.

The marks are classified into a first mark group, a second mark group, a third mark group, and a fourth mark group according to the object groups of the tracking objects they are designated to mark. For example, the marks for the tracking object of the first object group are classified into the first mark group, the marks for the tracking object of the second object group are classified into the second mark group, the marks for the tracking object of the third object group are classified into the third mark group, and the marks for the tracking object of the fourth object group are classified into the fourth mark group. The marks of the same mark group are generated at the same time, and the marks of the different mark groups are generated in sequence and repeatedly. For example, the mark generating device 20 generates the marks of the first mark group, the marks of the second mark group, the marks of the third mark group, and the marks of the fourth mark group in sequence and repeatedly.

Figure 2:
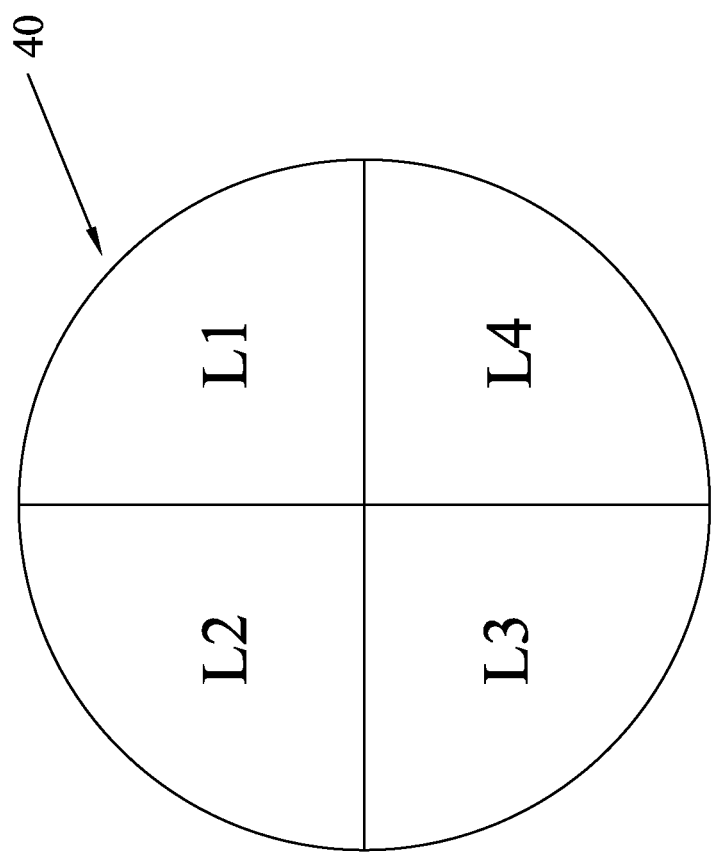
FIG. 2 is a front view of focusing device of first the preferred embodiment of the present invention.

The focusing device 40 has a plurality of lens members, and the lens members are moved to a position in front of the mark generating device 20 in sequence and repeatedly to refract the marks, respectively. As shown in FIG. 2, the focusing device 40 is a single lens having four portions with different thicknesses and/or surface profiles to form a first lens member L1, a second lens member L2, a third lens member L3, and a fourth lens member L4. The lens members L1-L4 have different focal lengths, wherein the first lens member L1 has the shortest focal length, the second and the third lens members L2 and L3 has the second and the third shortest focal lengths, and the fourth lens member L4 has the longest focal length. The focusing device 40 is placed next to the mark generating device 20 and is controlled by the processor 30 to rotate in a constant angular velocity that the first to the fourth lens members L1-L4 will be moved a position in front of the mark generating device 20 in sequence and repeatedly to refract the marks, respectively.

Figure 8:
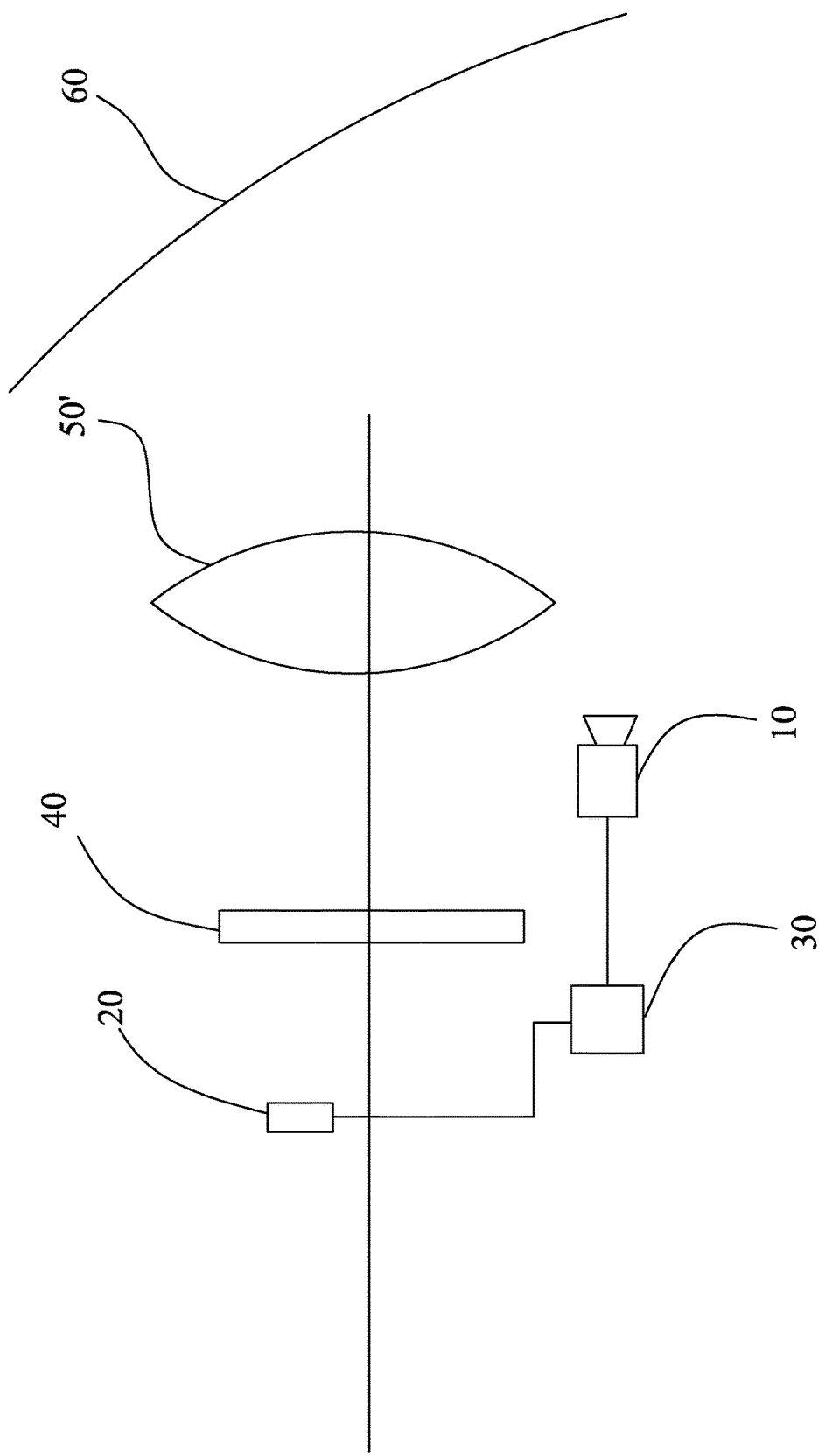
FIG. 8 is a ketch diagram of a second preferred embodiment of the present invention.

The imaging device 50 has a least a lens and/or at least a mirror to transmit the marks which are refracted by the focusing device 40 to a target 60. FIG. 1 shows that the imaging device 50 has a convex lens, and FIG. 8 shows that an imaging device 50' has a mirror. In the present embodiment, the target 60 is a windshield of a vehicle. In another embodiment, the target 60 is retinas of a user. The imaging device 50 images a virtual image on the target 60.

Figure 3:
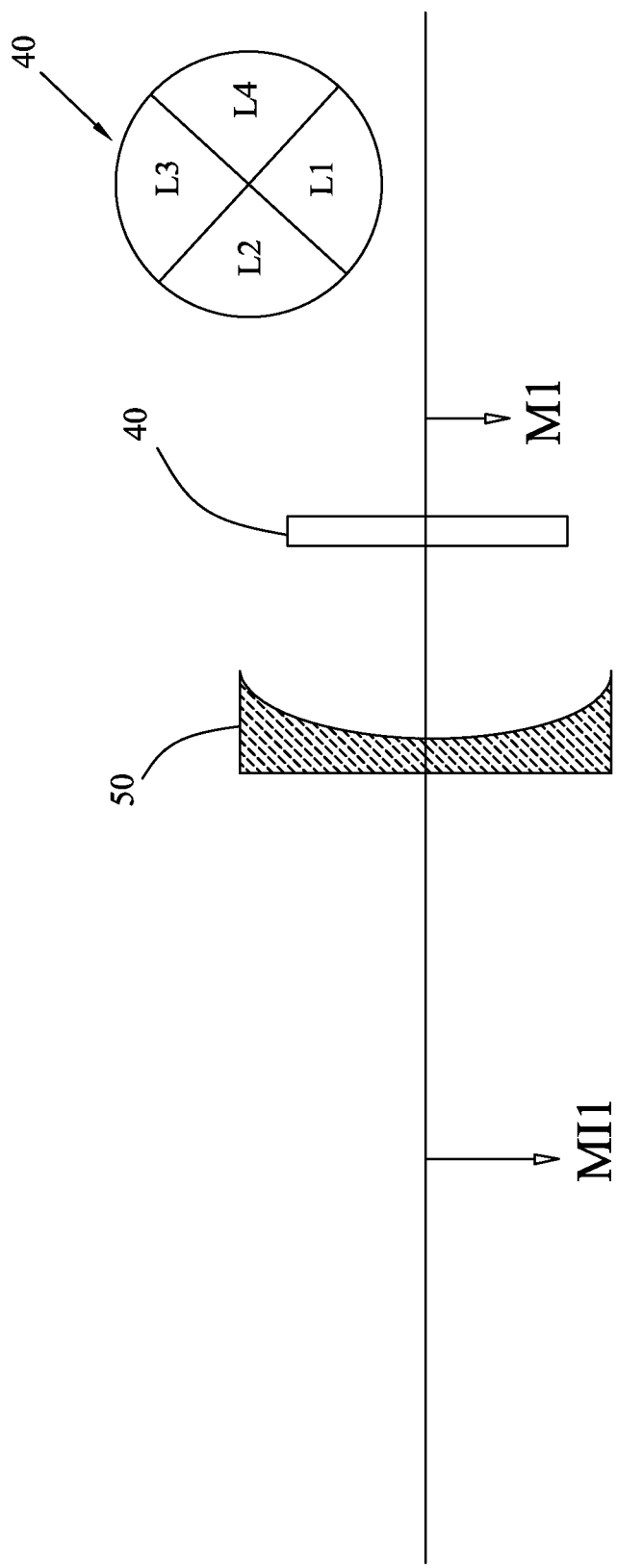
FIG. 3 is a sketch diagram of the first preferred embodiment of the present invention, showing the mark being refracted by the first lens member of the focusing device.
Figure 4:
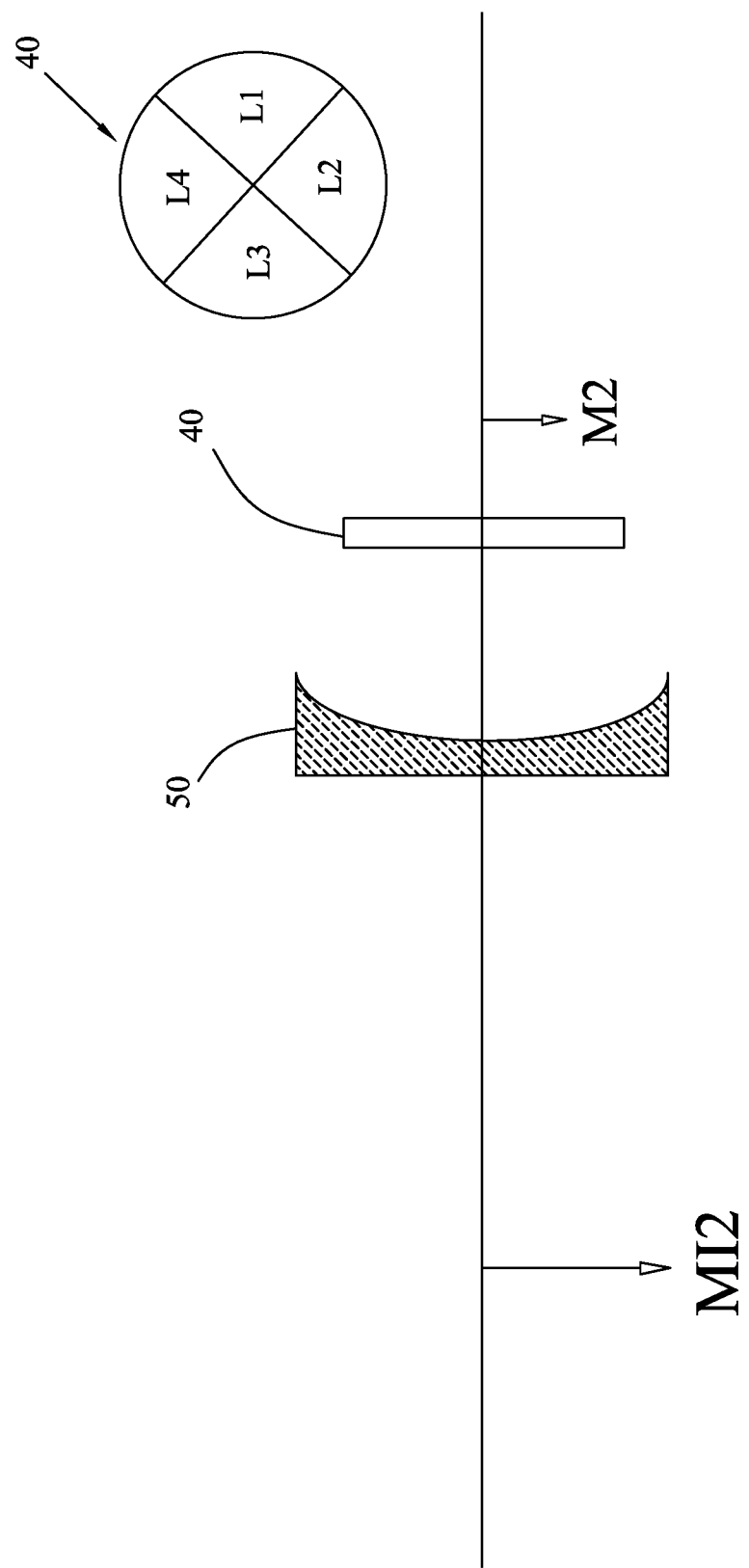
FIG. 4 is a sketch diagram of the first preferred embodiment of the present invention, showing the mark being refracted by the second lens member of the focusing device.
Figure 5:
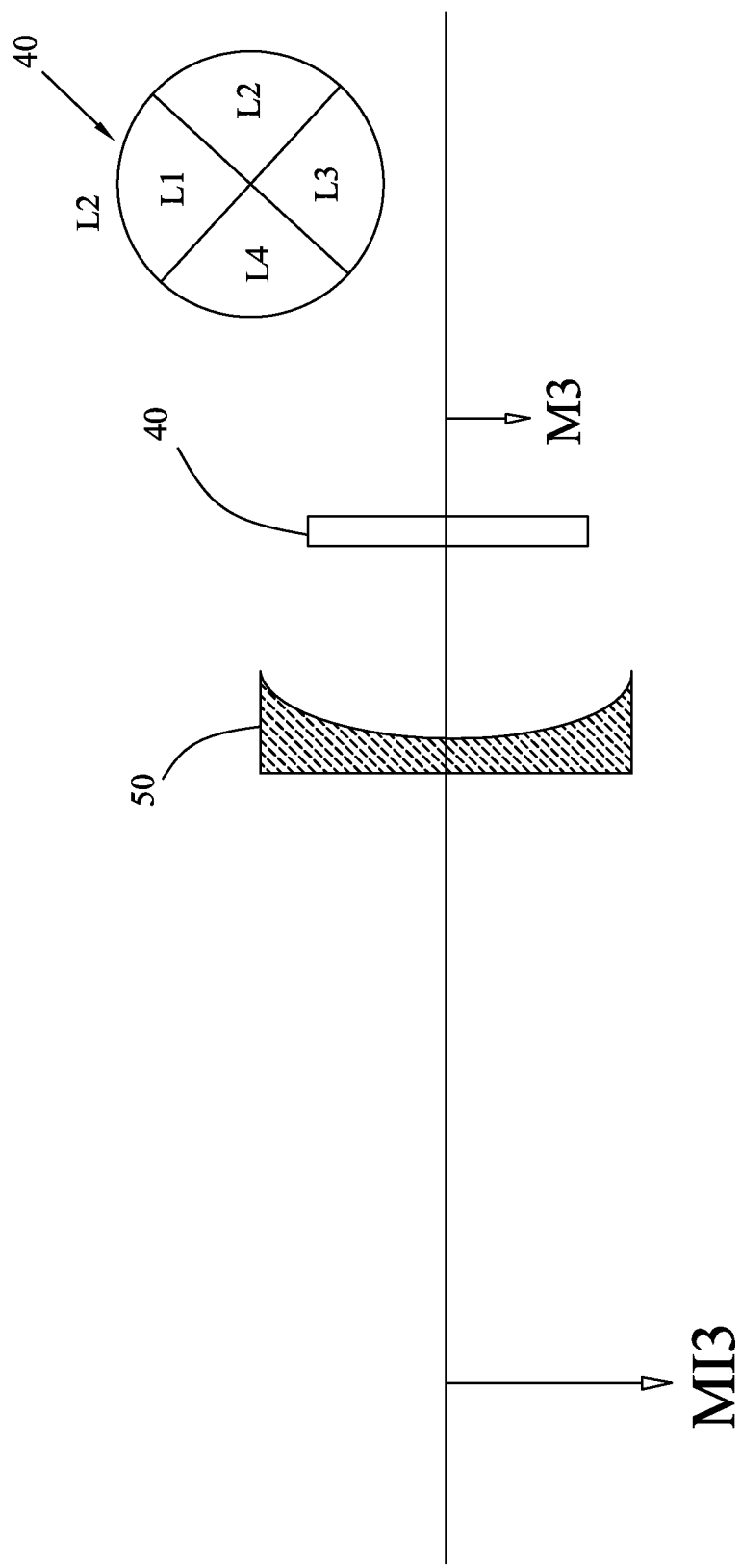
FIG. 5 is a sketch diagram of the first preferred embodiment of the present invention, showing the mark being refracted by the third lens member of the focusing device.
Figure 6:
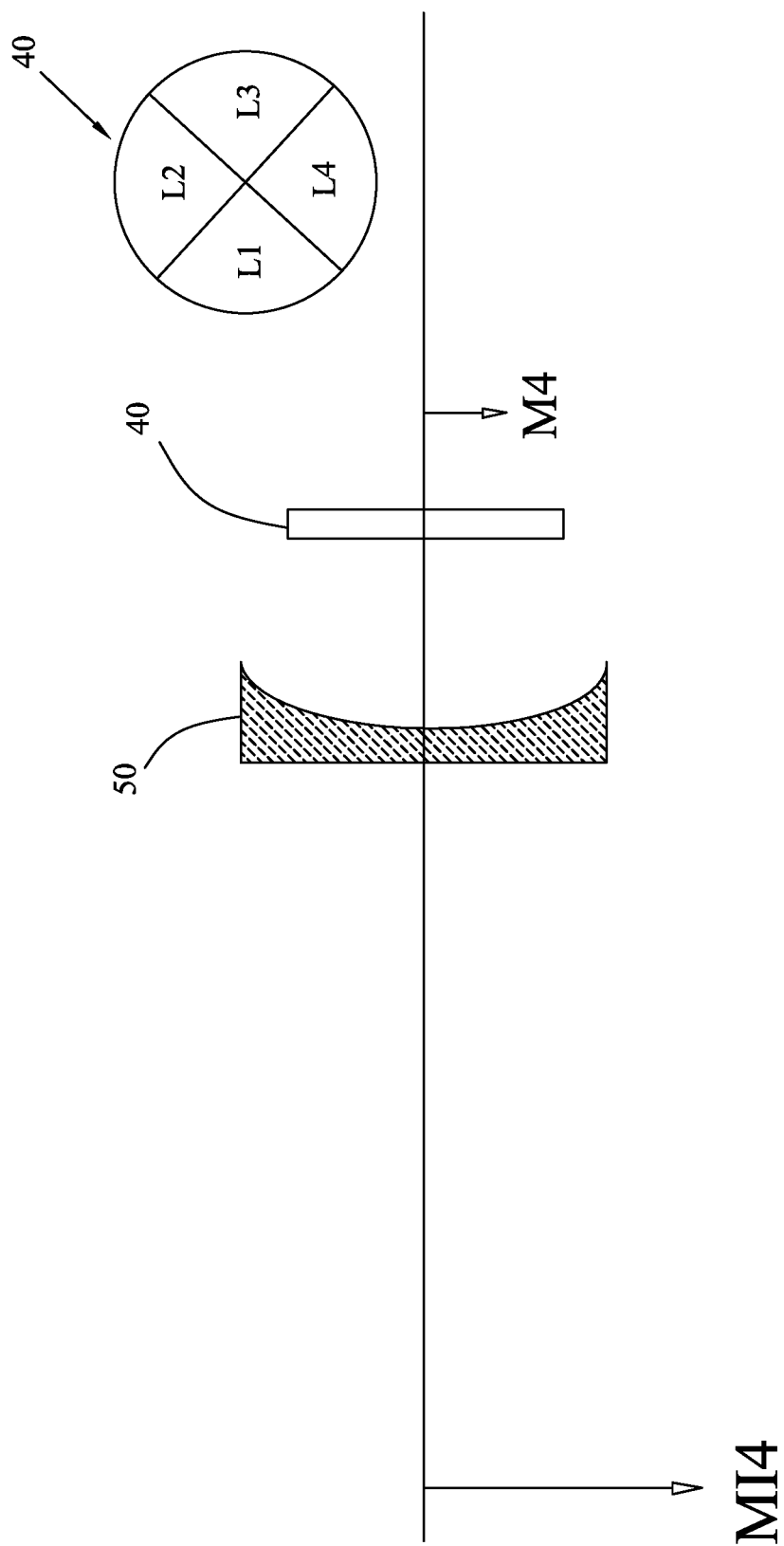
FIG. 6 is a sketch diagram of the first preferred embodiment of the present invention, showing the mark being refracted by the fourth lens member of the focusing device.

As shown in FIG. 3, it shows the first lens member L1 of the focusing device 40 is moved to a position in front of the mark generating device 20, the mark generating device 20 generates a mark M1 of the first mark group to be refracted by the first lens member L1 of the focusing device 40 to form a mark image MI1. FIGS. 4 to 6 show the second, the third and the fourth lens members L2, L3, and L4 refract the marks M2, M3, and M4 to form the mark images MI2, MI3, and MI4, respectively. It is to understand that the mark images MI1, MI2, MI3, and MI4 because they are respectively refracted by the lens members L1-L4 which have different focal lengths. In the present embodiment, the image mark MI4 has the longest image distance, the next is the image mark MI3 and the image mark MI2 in sequence, and the image mark MI1 has the shortest image distance.

Figure 7:
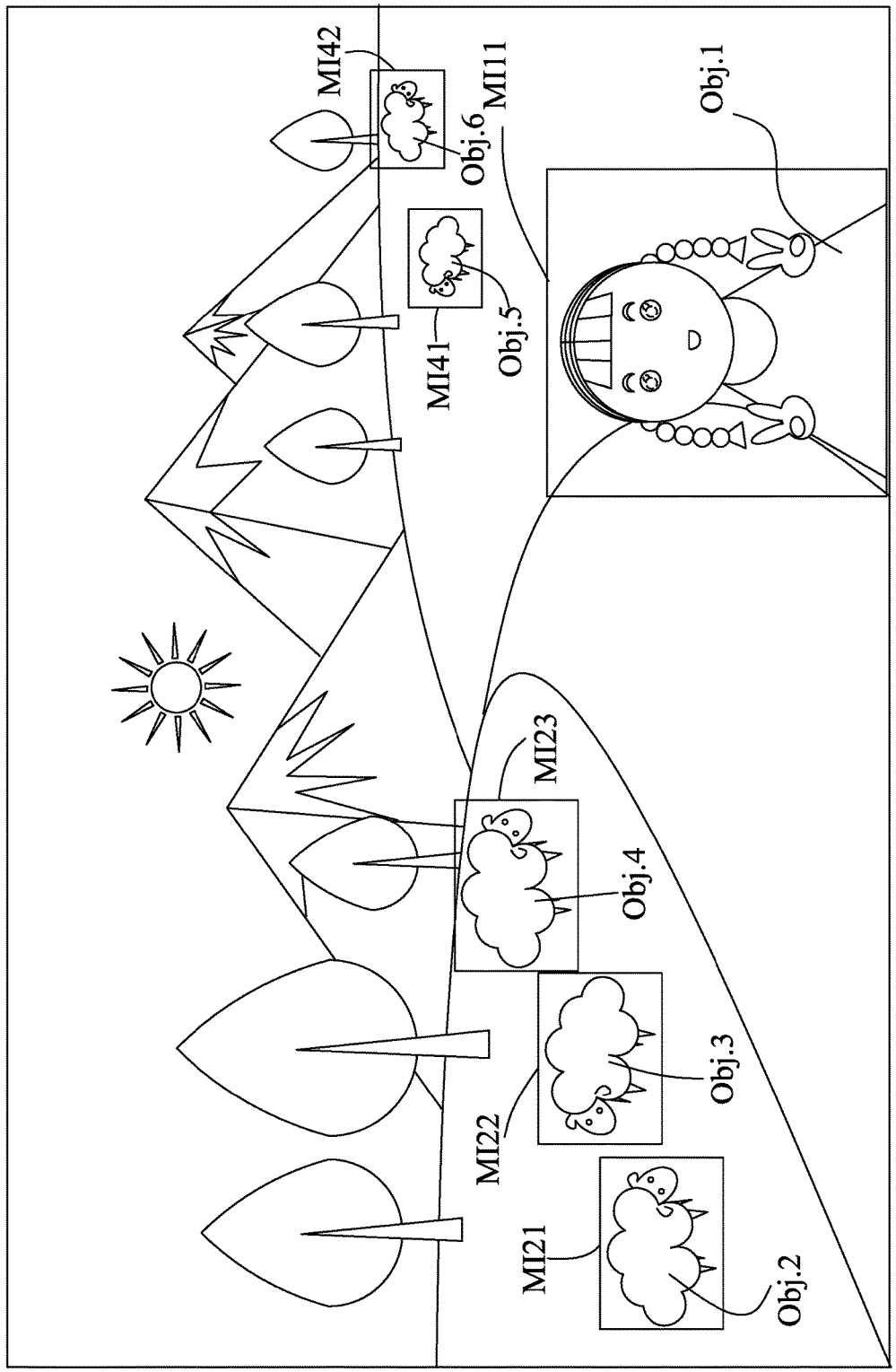
FIG. 7 is a perspective view of the first preferred embodiment of the present invention, showing the marks being projected onto a windshield to track the objects.

FIG. 7 shows a view of a driver sitting in a vehicle and seeing through a windshield 60. The image capturing device 10 captures the image frames of the same view, and the processor 30 determines that there are six tracking objects Obj. 1, Obj. 2, Obj. 3, Obj. 4, Obj. 5, and Obj. 6, and distances of the tracking objects Obj. 1-Obj. 6 are obtained at the same time. According to the distances of the tracking objects Obj. 1-Obj. 6, the processor 30 classifies the tracking object Obj. 1 into the first object group, classifies the tracking objects Obj. 2, Obj. 3, and Obj. 4 into the second object group, and classifies the tracking objects Obj. 5 and Obj. 6 into the fourth object group. It is noted that no tracking object is located at a range of the third object group, so that no tracking object is classified into the third object group. Next, the mark generating device 20 generates a mark of the first mark group relating to the tracking object Obj. 1 of the first object group, three marks of the second mark group relating to the tracking objects Obj. 2, Obj. 3, and Obj. 4 of the second object group, none for the third mark group, and two marks of the fourth mark group relating to the tracking objects Obj. 5 and Obj. 6 of the third object group, in sequence and repeatedly.

As discussed above, the mark of the first mark group is refracted by the first lens member L1 of the focusing device 40, and then imaged on the windshield 60 through the imaging device to have a mark image MI11 of the first mark group marking the tracking object Obj. 1, the marks of the second mark group are refracted by the second lens member L2 to image three mark images MI21, MI22, MI23 of the second mark group on the windshield 60 to mark the tracking object Obj. 2, Obj. 3, and Obj. 4 of the second object group, and the marks of the fourth mark group are refracted by the fourth lens member L4 to image two mark images MI41 and MI42 of the fourth mark group on the windshield 60 to mark the tracking object Obj. 5 and Obj. 6 of the fourth object group.

As a result, the mark images on the windshield 60 have different image lengths according to the tracking objects they mark. For example, the mark image MI11 marking the closest tracking object Obj. 1 has the shortest image lengths, and the mark images MI41 and MI42 marking farthest tracking object Obj. 5 and Obj. 6 have the longest image length.

When image capturing device 10 captures a new image frame, the above processes are repeated to track the tracking objects.

Figure 9:
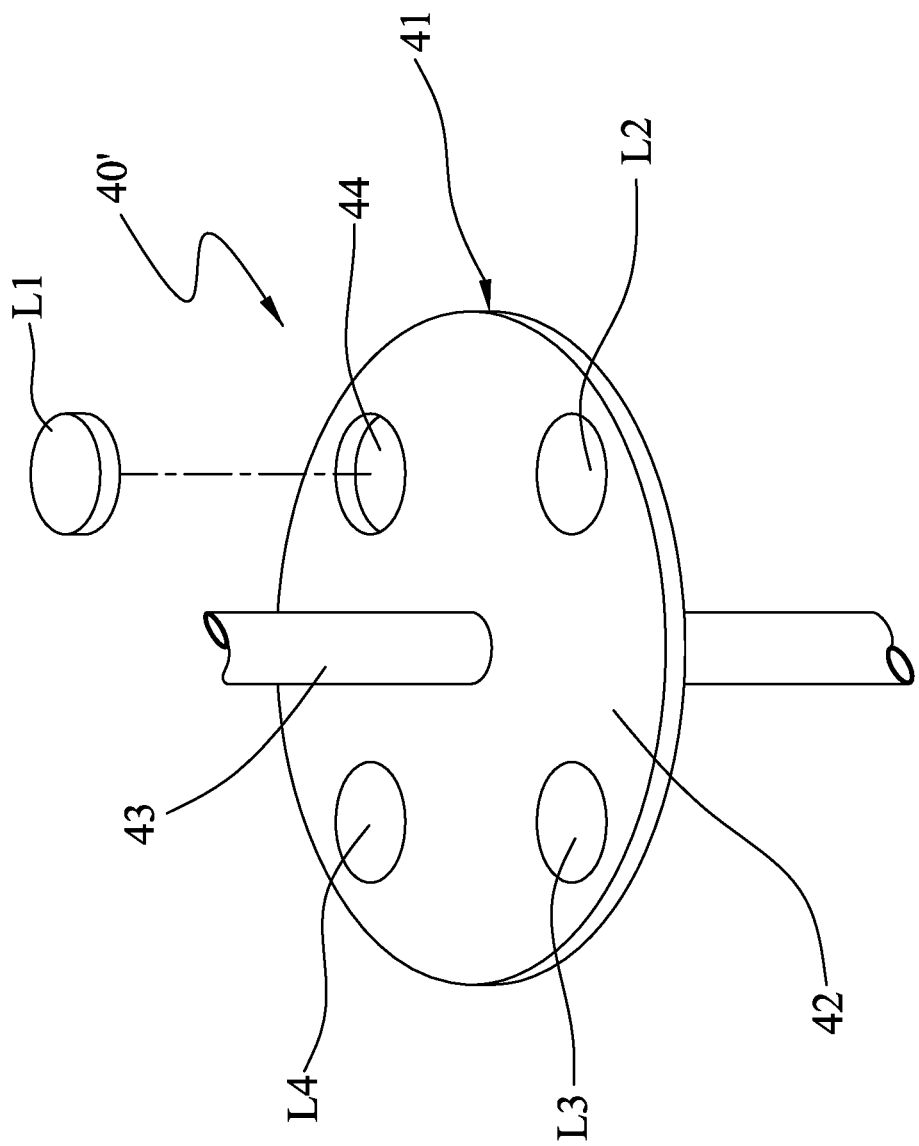
FIG. 9 is a perspective view of the focusing device of a third preferred embodiment of the present invention.

FIG. 9 shows a visual tracking system of the third preferred embodiment, which is the same as the first preferred embodiment, except that a focusing device 40' has a carrier 41 and four lens members L1-L4 mounted on the carrier 41. The carrier 41 has a disk 42 and a shaft 43 passing through a center of the disk 42. The disk has four bores 44 around the shaft 43, and the lens members L1-L4 are mounted in the bores 44 respectively. The image capturing device 10 captures e shaft 43 is connected to a motor (not shown) to turn the disk 42 and the lens members L1-L4. The function of the visual tracking system of the third preferred embodiment is the same as above, so we do not describe the detail again.

As shown in FIG. 10, a visual tracking system of the fourth preferred embodiment of the present invention includes an image capturing device 10, a mark generating device 20', a processor 30, and an imaging device 50".

The same as above, the image capturing device 10 captures image frames, and transmits the image frame to the processor 30. The processor 30 analyzes the image frame to determine the tracking objects and distances of the tracking objects and classify the tracking objects into several object groups according to their distances.

The mark generating device 20' has a plurality of mark generators electrically connected to the processor 30. In the present embodiment, the mark generating device 20' has a first mark generator 21, a second mark generator 22, a third mark generator 23, and a fourth mark generator 24. The first mark generator 21 generates marks of the first mark group relating to the objects of the first object group, the second mark generator 22 generates marks of the second mark group relating to the objects of the second object group, the third mark generator 23 generates marks of the third mark group relating to the objects of the third object group, and the fourth mark generator 24 generates marks of the fourth mark group relating to the objects of the fourth object group. The first to the fourth mark generators 21-24 are controlled by the processor to generate the marks in sequence and repeatedly.

The imaging device 50" includes a movable optical member 51, and an imaging optical member 52. In the present embodiment, the movable optical member 51 is a mirror controlled by the processor 30 to rotate in a predetermined angular velocity. The first to the fourth mark generators 21-24 are around the movable optical member 51, and distances between each of the mark generators 21-24 and a center C of the movable optical member 51 are different. In the present embodiment, the distance between the center C of the movable optical member 51 and the first mark generator 21 is shortest, the second and the third mark generators 22 and 23 have the second and the third shortest distances, respectively, and the fourth mark generator 24 has the longest distance.

Figure 11:
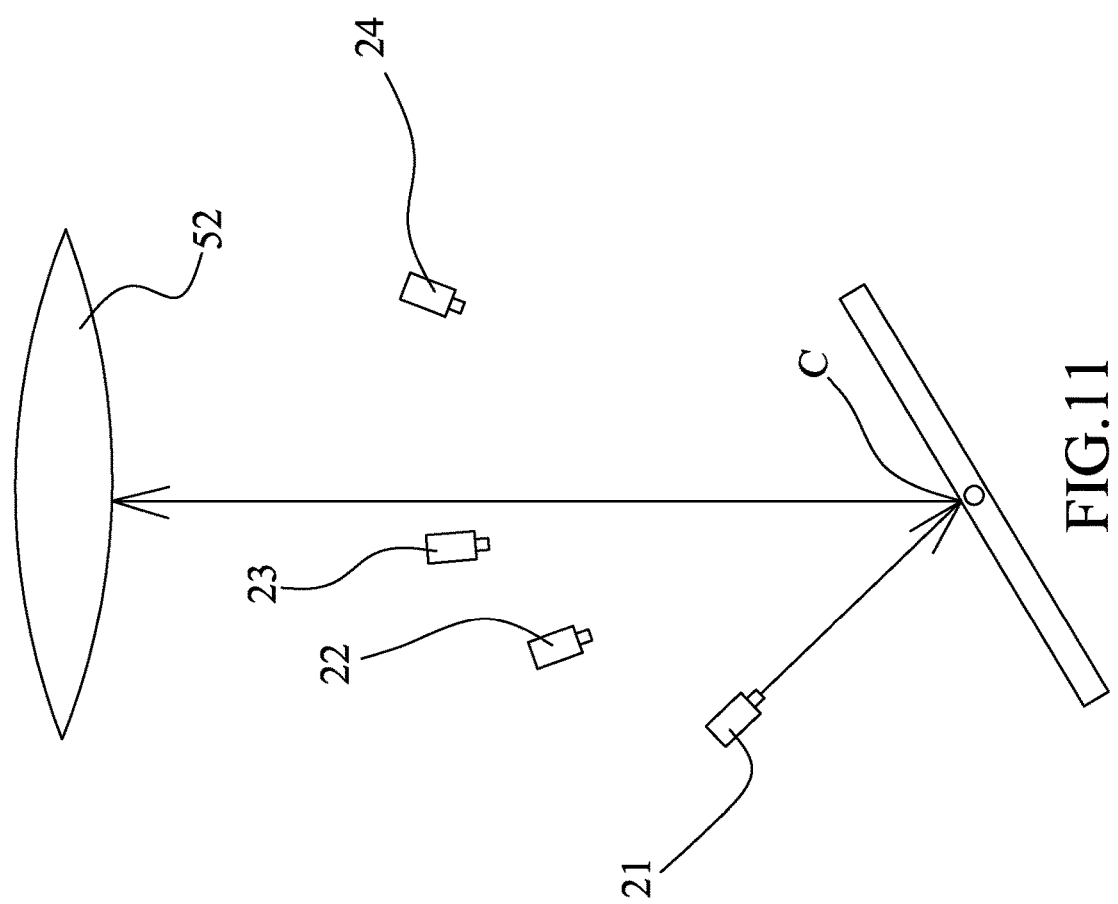
FIG. 11 is a ketch diagram of the fourth preferred embodiment of the present invention, showing the first mark generating device projecting the first marks to be reflected by the movable optical member.
Figure 12:
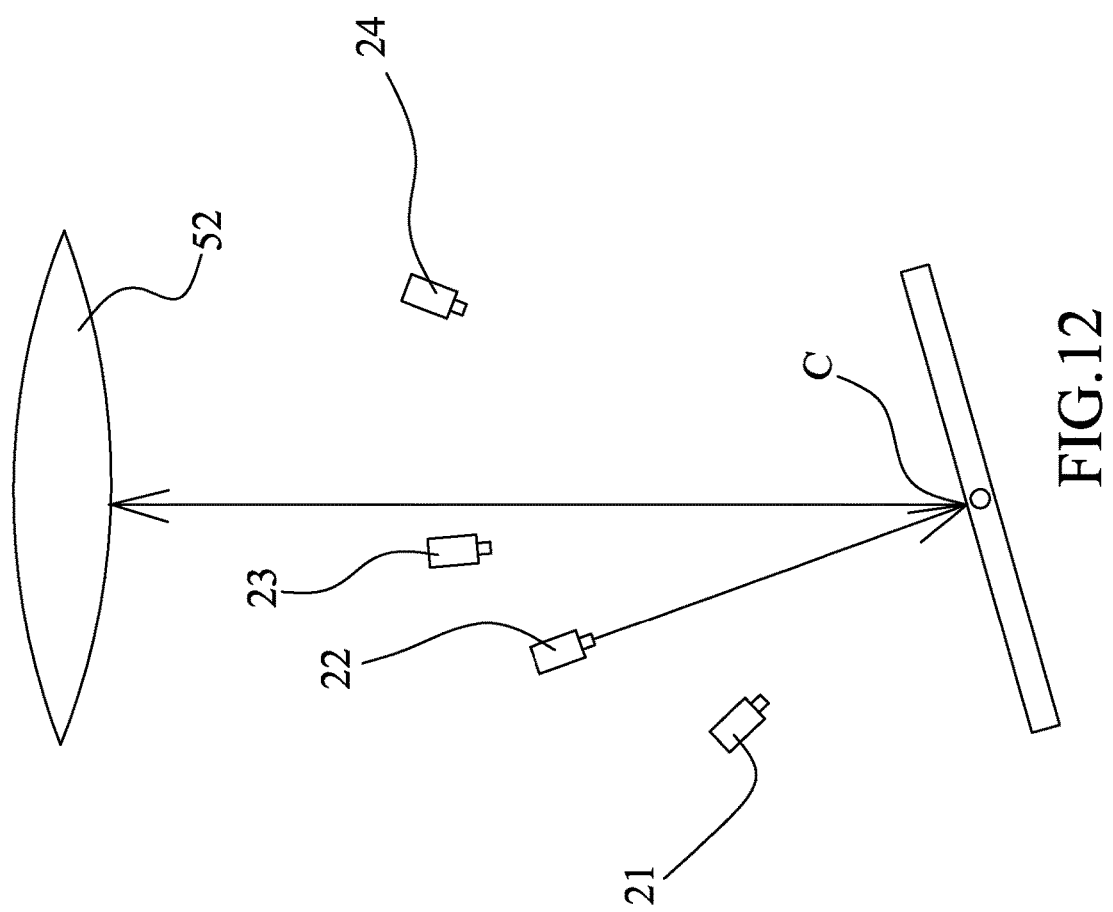
FIG. 12 is a ketch diagram of the fourth preferred embodiment of the present invention, showing the second mark generating device projecting the second marks to be reflected by the movable optical member.
Figure 13:
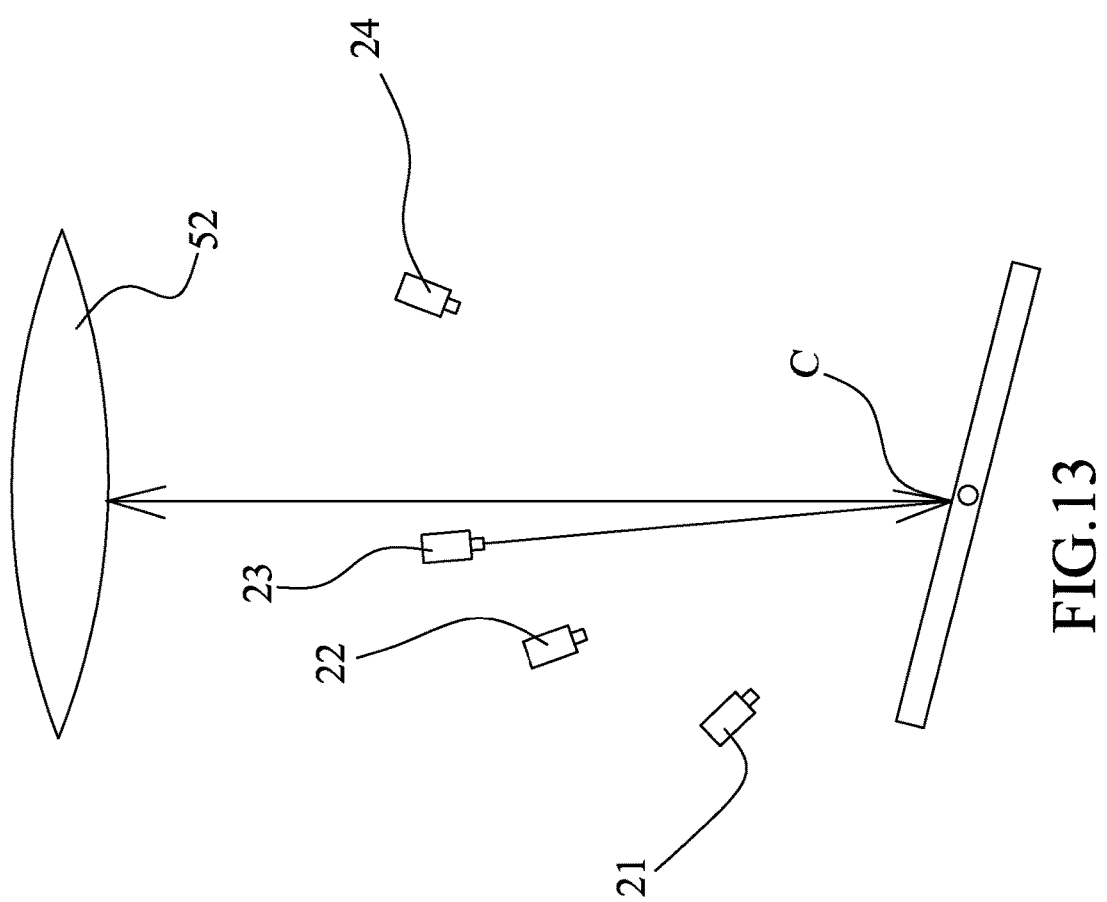
FIG. 13 is a ketch diagram of the fourth preferred embodiment of the present invention, showing the third mark generating device projecting the third marks to be reflected by the movable optical member.
Figure 14:
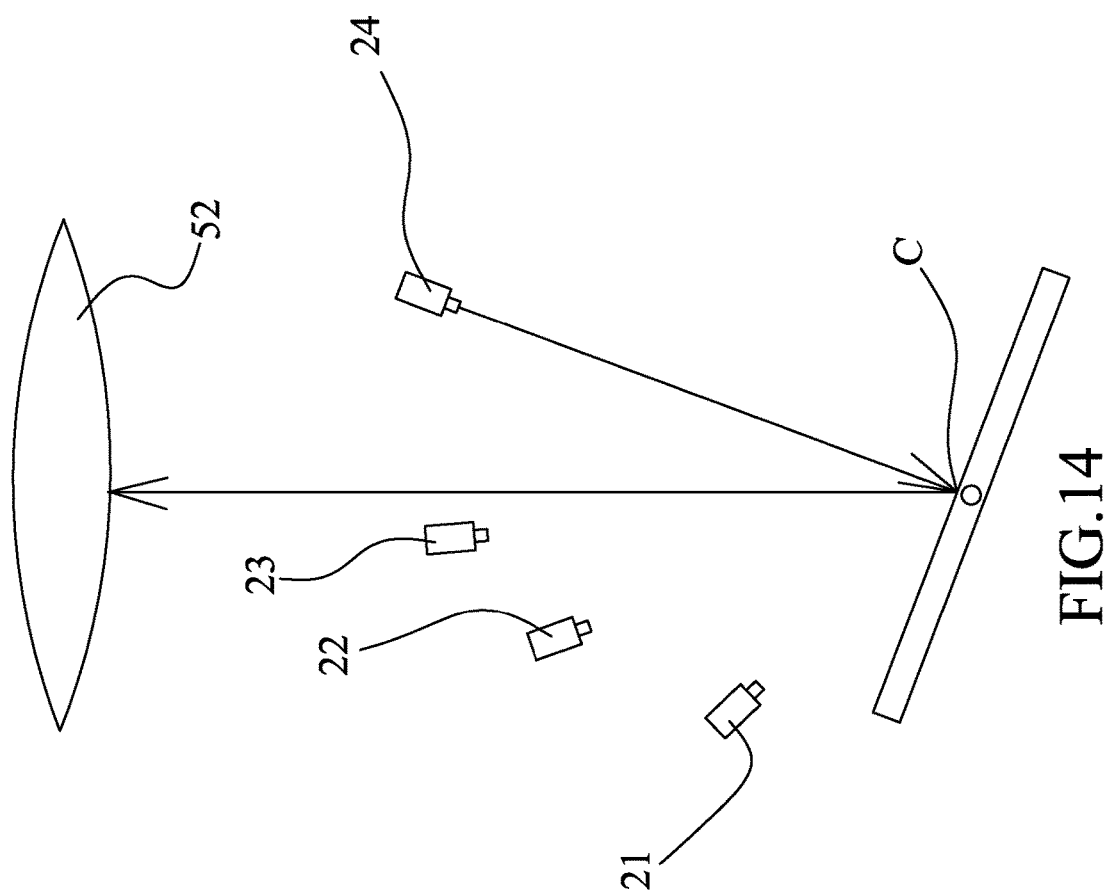
FIG. 14 is a ketch diagram of the fourth preferred embodiment of the present invention, showing the fourth mark generating device projecting the fourth marks to be reflected by the movable optical member.

The first to the fourth mark generators 21-24 emit the marks of the first to the fourth mark groups to the movable optical member 51 in sequence and repeatedly, and the rotating movable optical member 51 reflects the marks to the imaging optical member 52. As shown in FIG. 11, when the first mark generator 21 generates the marks of the first mark group, the movable optical member 51 is turned to a first angle to reflect the marks of the first mark group to the imaging optical member 52. FIGS. 12 to 14 respectively show that the second to the fourth mark generators 22-24, and the movable optical member 51 is turned to a second angle (FIG. 12), a third angle (FIG. 13), and a fourth angle (FIG. 14) to reflect the marks of the second to the fourth mark groups to the imaging optical member 52. The imaging optical member 52 images the marks onto a target 60 to mark the tracking objects respectively. in the present embodiment, the imaging optical member 52 has a convex lens, and in other embodiments, the imaging optical member 52 may have at least a concave lens, at least a mirror, or other optical member to transmit light.

Because the distances between the first to the fourth mark generators 21-24 and the center of the movable optical member are different, which means object distances of the marks of the first to the fourth mark groups are different, so that the mark images of the first to the fourth mark groups will have different image distances to meet the tracking objects they mark.

The function of the fourth preferred embodiment is that same as above, so we do not describe the detail again.

It must be pointed out that the embodiments described above are only some preferred embodiments of the present invention. All equivalent structures which employ the concepts disclosed in this specification and the appended claims should fall within the scope of the present invention.

What is claimed is:

1. A visual tracking system, comprising:
an image capturing device capturing image frames;

a processor receiving the image frames from the image capturing device to determine tracking objects in the image frames and distances of the tracking objects, and then classify the tracking objects into a first object group and a second object group according to the distances thereof;

a mark generating device electrically connected to the processor to generate marks of a first mark group relating to the tracking objects of the first object group and marks of a second mark group relating to the tracking objects of the second object group, wherein the marks of the first mark group are generated at the same time, the marks of the second mark group are generated at the same time, and the marks of the first mark group and the marks of the second mark group are generated in sequence and repeatedly;

a focusing device having a first lens member and a second lens member, wherein the first lens member and the second lens member have different focal lengths;

wherein the first lens member and the second lens member are moved to a predetermined position in sequence and repeatedly, whereby when the mark generating device is generating the marks of the first mark group, the first lens member is moved to the predetermined position to refract the marks of the first mark group, and when the mark generating device is generating the marks of the second mark group, the second lens member is moved to the predetermined position to refract the marks of the second mark group; and an imaging device imaging the marks after being refracted by the first lens member or the second lens member onto a target.

2. The visual tracking system of claim 1, wherein the first lens member and the second lens member are formed on a single lens, and the single lens is driven to rotate.

3. The visual tracking system of claim 1, wherein the focusing device further has a carrier, on which the first lens member and the second lens member are mounted, and the carrier is driven to rotate.

4. The visual tracking system of claim 3, wherein the carrier of the focusing device has a disk and a shaft passing through a center of the disk; the disk is provided with bores, in which the first lens member and the second lens member are mounted respectively.

5. A method of providing mark images with multiple image distances on a target to mark tracking objects of different distances, comprising the steps of:
A. obtaining an image frame;
B. determining tracking objects in the image frame;
C. obtaining distances of the tracking objects, and classifying the tracking objects into a first object group and a second object group according to the distances thereof;
D. generating marks of a first mark group relating to the tracking objects of the first object group and marks of a second mark group relating to the tracking objects of the second object group in sequence and repeatedly;
E. refracting the marks of the first mark group by a first lens member and imaging the marks of the first mark group onto a target, and refracting the marks of the second mark group by a second lens member and imaging the marks of the second mark group onto the target, wherein the first lens member and the second lens member have different focal lengths; and
F. obtaining a new image frame and then repeating the step B to the step F.

6. The method of claim 5, wherein the marks of the first mark group are generated at the same time, and the marks of the second mark group are generated at the same time.

7. The method of claim 5, wherein the first lens member and the second lens member are moved to a predetermined position in sequence and repeatedly to repeatedly refract the marks of the first mark group and the marks of the second mark group.

8. The method of claim 7, wherein the first lens member and the second lens member are formed on a single lens, and the single lens is driven to rotate.

9. The method of claim 7, wherein the first lens member and the second lens are mounted on a carrier, and the carrier is driven to rotate.

10. The method of claim 5, wherein the distances of the tracking objects are determined by an image analyze process.

11. A visual tracking system, comprising:
an image capturing device capturing image frames;
a processor receiving the image frames from the image capturing device to determine tracking objects in the image frames and distances of the tracking objects, and then classify the tracking objects into a first object group and a second object group according to the distances of the tracking objects;
a mark generating device having a first mark generator and a second mark generator, wherein the first mark generator and the second mark generator electrically connected to the processor; the first mark generator generates marks of a first mark group relating to the tracking objects of the first object group, and the second mark generator generates marks of a second mark group relating to the tracking objects of the second object group; and
an imaging device having a movable optical member, wherein a distance between the first nark generator and a center of the movable optical member is different from a distance between the second nark generator and the center of the movable optical member;
wherein when the first mark generator is generating the marks of the first mark group, the movable optical member is moved to a predetermined position to image the marks of the first mark group onto a target, and when the second mark generator is generating the marks of the second mark group, the movable optical member is moved to another predetermined position to image the marks of the second mark group onto the target.

12. The visual tracking system of claim 11, wherein the movable optical member is a mirror to be driven to rotate.

13. The visual tracking system of claim 11, wherein the image device further has an imaging optical member; the movable optical member transmits the marks of the first and the second mark groups to the imaging optical member, and then the imaging optical member images the marks onto the target.

* * * * *